United States Patent
Lebouill (10) Patent No.: US 7,275,095 B1
(45) Date of Patent: Sep. 25, 2007

(54) INTERNET SUBSCRIBER MANAGEMENT

(75) Inventor: Gilles Lebouill, Paris Cedex (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 150 days.

(21) Appl. No.: 10/019,915

(22) PCT Filed: Jul. 3, 2000

(86) PCT No.: PCT/IB00/00970

§ 371 (c)(1),
(2), (4) Date: Jan. 4, 2002

(87) PCT Pub. No.: WO01/03422

PCT Pub. Date: Jan. 11, 2001

(30) Foreign Application Priority Data

Jul. 5, 1999 (EP) ................................. 99401680
Jul. 23, 1999 (EP) ................................. 99401890

(51) Int. Cl.
*G06F 15/16* (2006.01)
*H04N 7/173* (2006.01)

(52) U.S. Cl. ....................... 709/223; 709/249; 725/109

(58) Field of Classification Search ................ 709/224, 709/218, 219, 206, 228; 725/1, 4, 153, 108, 725/111, 112, 148
See application file for complete search history.

(56) References Cited

U.S. PATENT DOCUMENTS

| 5,722,041 | A | * | 2/1998 | Freadman ...................... 725/82 |
| 5,724,525 | A | * | 3/1998 | Beyers et al. .................. 705/40 |
| 5,771,354 | A | | 6/1998 | Crawford ............... 395/200.59 |
| 5,794,221 | A | * | 8/1998 | Egendorf ..................... 705/40 |
| 5,850,218 | A | * | 12/1998 | LaJoie et al. ................. 725/45 |
| 5,884,284 | A | * | 3/1999 | Peters et al. ................... 705/30 |
| 5,918,013 | A | * | 6/1999 | Mighdoll et al. ........... 709/217 |
| 5,983,273 | A | * | 11/1999 | White et al. ................. 709/229 |
| 6,041,327 | A | * | 3/2000 | Glitho et al. .................. 707/10 |
| 6,049,831 | A | * | 4/2000 | Gardell et al. .............. 709/236 |
| 6,072,483 | A | * | 6/2000 | Rosin et al. ................. 715/716 |
| 6,137,805 | A | * | 10/2000 | Berstis ........................ 370/428 |
| 6,144,942 | A | * | 11/2000 | Ruckdashel ..................... 705/9 |
| 6,199,114 | B1 | * | 3/2001 | White et al. ................. 709/229 |
| 6,256,771 | B1 | * | 7/2001 | O'Neil et al. ............... 717/100 |
| 6,385,203 | B2 | * | 5/2002 | McHale et al. ............. 370/401 |
| 6,400,407 | B1 | * | 6/2002 | Zigmond et al. ........... 348/465 |
| 6,430,275 | B1 | * | 8/2002 | Voit et al. .............. 379/114.17 |
| 6,434,562 | B1 | * | 8/2002 | Pennywitt et al. ............ 707/10 |
| 6,459,427 | B1 | * | 10/2002 | Mao et al. ................... 725/109 |

(Continued)

FOREIGN PATENT DOCUMENTS

EP        866611 A1 *   9/1998

(Continued)

OTHER PUBLICATIONS

Zigmond, D.J. et al., "Linking television to the Internet: EIA-746 and beyond", IEEE ICCE, pp. 282-283, Jun. 1998.*

*Primary Examiner*—Patrice Winder
(74) *Attorney, Agent, or Firm*—Osha Liang LLP (57) ABSTRACT

A subscriber information management system for use with a broadcast system, and a method of managing subscriber information, are described. The system includes storing subscriber internet parameters relating to internet services access and storing subscriber broadcast parameters relating to broadcast services access. The internet and broadcast parameters are linked.

31 Claims, 4 Drawing Sheets

U.S. PATENT DOCUMENTS

6,493,722 B1 * 12/2002 Daleen et al. ............ 707/104.1
6,539,548 B1 *  3/2003 Hendricks et al. .......... 725/109
6,636,890 B1 * 10/2003 Mandalia .................... 709/206

FOREIGN PATENT DOCUMENTS

| | | | |
|---|---|---|---|
| EP | 877499 A2 | * | 11/1998 |
| EP | 1067772 A1 | * | 1/2001 |
| WO | 97/09827 | | 3/1997 |
| WO | WO9843427 A1 | * | 10/1998 |

* cited by examiner

INTERNET SUBSCRIBER MANAGEMENT

BACKGROUND OF THE INVENTION

The invention relates generally to control of access and management of subscriber information in distributed systems, and in preferred applications relates to subscriber information management systems, to a subscription broadcast system, to a method of managing subscriber information and to a method of notifying a subscriber of an event.

In known internet systems, a subscriber is allocated an internet account by an internet service provider (ISP). The account is managed by an internet account management system which is located at the ISP. A subscriber uses a computer equipped with a modem to access the internet service provider via the public switched telephone network (PSTN).

Also known in the prior art are subscription broadcast systems which allow a subscriber to receive broadcast television programmes using a receiver/decoder. A subscriber management system located at the operator manages subscriptions to broadcast services.

In the prior art the processing of subscriber parameters may be cumbersome.

SUMMARY OF THE INVENTION

According to a first aspect of the present invention there is provided a subscriber information management system for use with a broadcast system, comprising means (for example, a memory or a server) for storing subscriber internet parameters relating to access to internet services by a subscriber and means (for example, a memory or a server) for storing subscriber broadcast parameters relating to access to broadcast services by the subscriber, wherein said internet and broadcast parameters are linked by the subscriber information management system.

By use of the invention, the processing of subscriber internet parameters and subscriber broadcast parameters may be facilitated. The subscriber internet parameters and the subscriber broadcast parameters are preferably stored in the same database, for example, a relational database, such that the two types of information are related to each other. Preferably, the subscriber broadcast parameters comprise information, such as account details, relating to the subscriber's subscription to broadcast services, and the subscriber internet parameters comprise information, such as account details, relating to the subscriber's subscription to internet services.

As used herein, the term "broadcast system" includes any transmission system, such as a satellite, terrestrial, cable or other system, for transmitting or broadcasting for example primarily audiovisual or multimedia data. Whilst the present invention is particularly applicable to a broadcast digital television system, the invention may also be applicable to a fixed telecommunications network for multimedia internet applications, to a closed circuit television, and so on.

Preferably the subscriber information management system further comprises means (for example, a system) for providing access to internet services for a subscriber having given broadcast parameters. The information management system may directly provide access to the internet depending on the broadcast parameters of the subscriber, or may simply pass the appropriate parameters to an ISP which physically provides connection to the internet.

Preferably the internet services include services for sending and receiving mail over the internet.

The subscriber internet parameters preferably comprise information relating to e-mail accounts of subscribers, such as e-mail addresses, passwords and/or other internet parameters. The subscriber broadcast parameters may comprise identifiers of receiver/decoders. This may provide a convenient method of linking subscription information relating to broadcast services and internet services. The identifiers of receiver/decoders may be, for example, based on identification numbers of smartcards issued in association with the receiver/decoders.

The term "receiver/decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box", such a decoder functioning in combination with a physically separate receiver, or such a decoder including additional functions, such as a web browser, a video recorder, or a television.

The system may be adapted to send data to a receiver/decoder via the broadcast system, which data include an identifier of the receiver/decoder. This may allow data to be sent to a specific subscriber via the broadcast system. The data may comprise, for example, a message for the subscriber, or information retrieved from the internet, or e-mail.

Preferably the system further comprises means (for example, a memory or a server) for storing information relating to the status of a subscriber. For example, a subscription may be indicated as active, suspended or cancelled. This can allow the subscriber information management system to decide whether or not a subscriber should be allowed access to internet services. Preferably the system further comprises means (for example, a memory or a server) for storing information relating to a subscription input by a subscriber. The information may be, for example, first and last names to be used for e-mails, and whether or not the subscriber wishes to make use of various services.

The system may further comprise means (for example, a memory or a server) for storing information relating to previous operations of an account by a subscriber. This can allow an operator to check previous operations carried out by a subscriber, for example to help with customer care.

The system may further comprise an interface for communicating with a Subscriber Management System for managing subscriptions to broadcast services. This can allow messages to be passed between the subscriber information management system and the Subscriber Management System to enable centralised billing of subscribers.

For example, the system may be adapted to receive subscription information from the Subscriber Management System. Examples of messages which may be passed from the Subscriber Management System to the subscriber information management system include smartcard number, create subscription, cancel subscription, modify subscription, suspend subscription, reactivate subscription, exchange smartcard. The system may be adapted to provide billing information, such as connection time to the internet, to the Subscriber Management System. The system may also comprise means (for example, a server) for monitoring usage of the internet to provide such billing information. Thus, the present invention also provides an internet account management system for use with a broadcast system, the manage ment system preferably storing information relating to e-mail accounts.

The system may further comprise means (for example, a system) for copying at least part of the subscriber internet parameters to an internet service provider. This can allow modifications to a user's account to be duplicated at the internet service provider, to ensure that the internet service provider is kept updated.

The system may further comprise a gateway for access to an internet service provider by a receiver/decoder. This can allow a receiver/decoder, which is not equipped with the necessary protocols to access the internet service provider directly, to access the internet service provider via the gateway. The gateway may also be responsible for routing messages from the receiver/decoder to the appropriate parts of the subscriber information system.

The system may further comprise means (for example, a server) for allowing a subscriber to register an event and means for generating an e-mail on occurrence of the event. In this way, a subscriber can register an event in advance and then be reminded of that event by means of an e-mail. Preferably, the subscriber is able to register the type of event, such as a birthday or wedding, and/or include a text message.

The above feature may be provided independently, and thus the invention also provides a subscriber information management system comprising means for allowing a subscriber to register an event and means for generating an e-mail on occurrence of the event. Preferably, the above system further comprises means (for example, a server) for monitoring events and for selecting events that are to be announced by means of an e-mail. The invention further provides a broadcast system including a subscriber information management system in any of the above forms.

The broadcast system may include a Subscriber Authorisation System for managing subscribers' orders for broadcast services and which is separate, preferably at a separate location, from the subscriber information management system.

The broadcast system may include a Subscriber Management System. The Subscriber Management System may be at the same location as the subscriber information management system. The subscriber information management system may be coupled to the Subscriber Management System but not (directly) to the Subscriber Authorisation System.

The broadcast system may further comprise an Internet Service Provider, and the subscriber information management system may be adapted to store subscriber information including subscriber smartcard numbers, and not to pass the subscriber smartcard numbers to the Internet Service Provider. By not passing smartcard numbers to the internet service provider, the security of the system may be improved.

It should be noted that the TV operator can choose to set up internally all the services provided by an Internet Service Provider, or to outsource all such services to an external Internet Service Provider. In the latter case, the TV operator system and the Internet Service Provider are linked together.

The invention also provides a system comprising a subscriber information management system for storing subscriber information including subscriber smartcard numbers, and an Internet Service Provider, in which the subscriber smartcard numbers are not passed to the Internet Service Provider.

In a method aspect of the present invention there is provided a method of managing subscriber information comprising storing subscriber internet parameters relating to internet services access and storing subscriber broadcast parameters relating to broadcast services access, wherein said internet and broadcast parameters are linked.

The method may further comprise providing access to the internet for a subscriber having given broadcast parameters. The subscriber broadcast parameters may comprise identifiers of receiver/decoders. The identifiers of receiver/decoders may be based on smartcard numbers of the receiver/decoders. The subscriber internet parameters may comprise e-mail addresses.

The method may further comprise sending data to a receiver/decoder via a broadcast system, which data include an identifier of the receiver/decoder. The method may further comprise storing information relating to the status of a subscriber. The method may further comprise storing information input by a subscriber. The method may further comprise storing information relating to previous operations by a subscriber.

The method may further comprise communicating with a Subscriber Management System which manages subscriptions to broadcast services. The method may further comprise receiving subscription information from said Subscriber Management System. The method may further comprise providing billing information to said Subscriber Management System.

The method may further comprise copying at least some of the subscriber internet parameters to an internet service provider. The method may further comprise providing a gateway for access to an internet service provider by a receiver/decoder. The method may further comprise generating an e-mail on occurrence of an event which has been registered by a subscriber.

In another method aspect there is provided a method of notifying a subscriber of an event comprising generating an e-mail on occurrence of an event which has been registered by a subscriber.

The invention also provides a method and apparatus substantially as described with reference to and as illustrated in the accompanying drawings.

Features of one aspect may be applied to other aspects; similarly, method features may be applied to apparatus aspects and vice versa.

Preferred features of the present invention will now be described, purely by way of example, with reference to the accompanying drawings, in which:—

DETAILED DESCRIPTION

Figure 1:
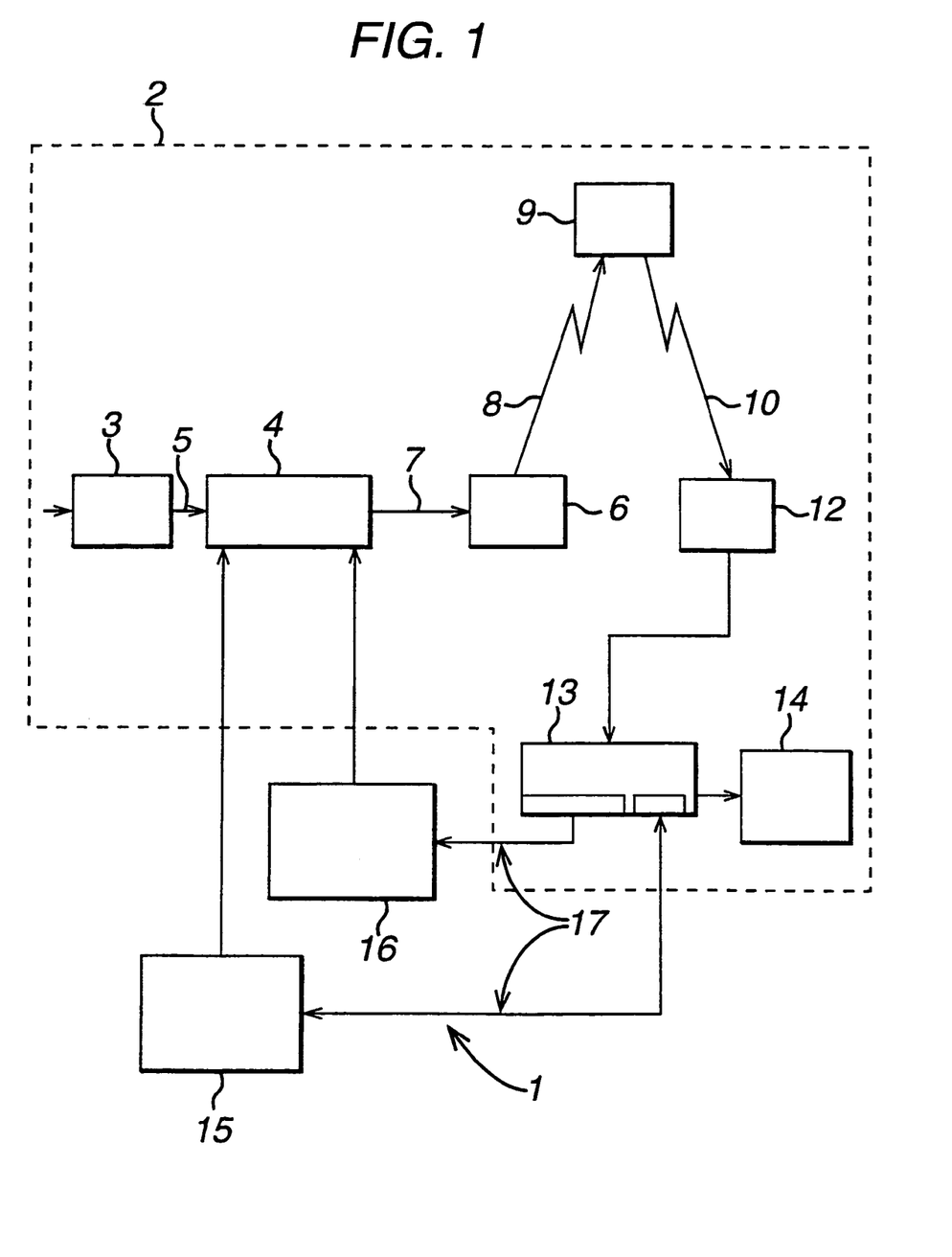
FIG. 1 shows the architecture of a typical digital television system.

An overview of a digital television system 1 is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals).

The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. Other transport channels for transmission of the data are of course possible, such as terrestrial broadcast, cable transmission, combined satellite/cable links, telephone networks etc.

The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the receiver/decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the receiver/decoder 13 and smartcard, the end user may purchase commercial offers in either a subscription mode or a pay-per-view mode.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 13 having access to an equivalent to the exploitation key stored on a smart card inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the receiver/decoder, enables the end user to interact with various applications via a modemed back channel 17. The modemed back channel may also be used for communications used in the conditional access system 15.

Figures 2, 6:
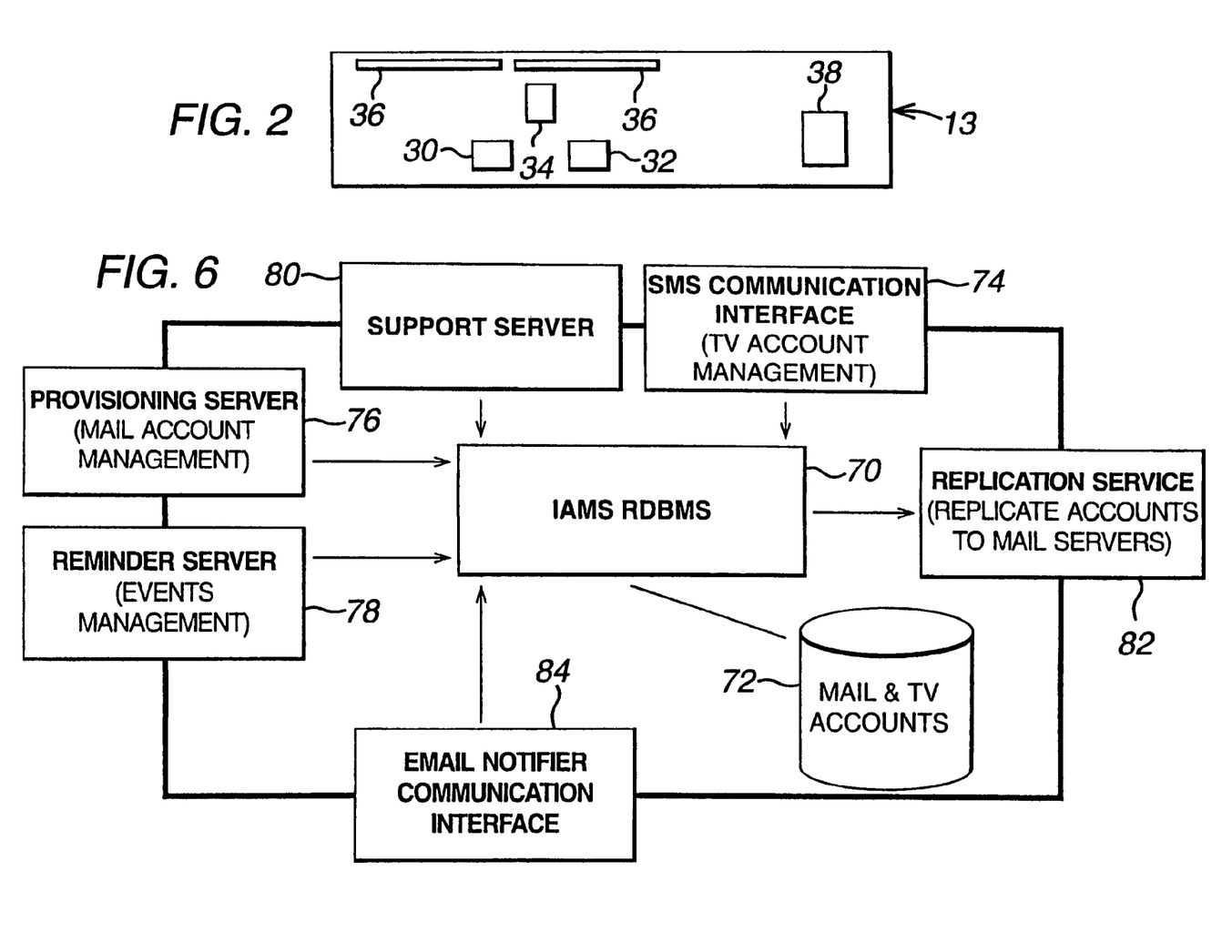
FIG. 2 is a schematic diagram of a receiver/decoder.
FIG. 6 shows the main components of an internet account management system.

Physical interfaces of the receiver/decoder 13 are used for downloading data. With reference to FIG. 2, the receiver/decoder 13 contains, for example, six downloading devices; serial interface 30, parallel interface 32, modem 34, two card readers 36, and MPEG flow tuner 38.

The broadcast and reception system is also used to provide internet services such as web browsing and e-mail. An application which is run by the receiver/decoder 13 enables the receiver/decoder to access internet services and to display web pages and e-mails either on television set 14 or via a computer connected to the receiver/decoder 13.

Figure 3:
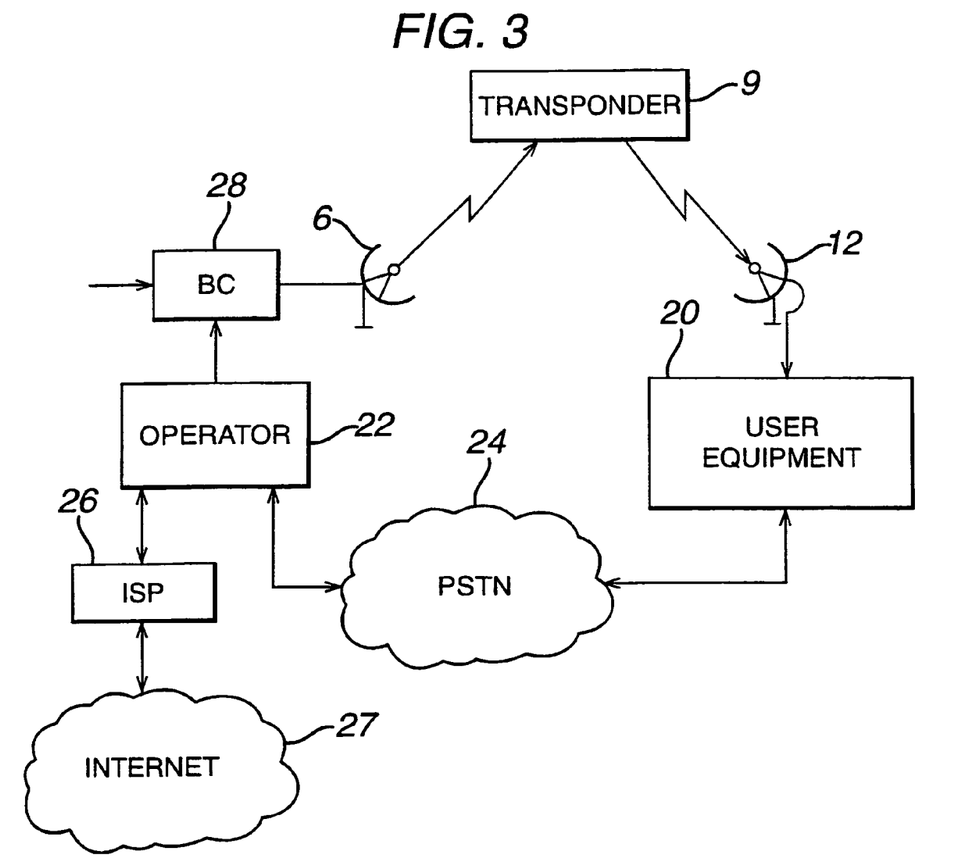
FIG. 3 shows an overview of an internet access system.

Referring to FIG. 3, an overview of the internet access system will be described. User equipment 20 (which includes a receiver/decoder) communicates with operator 22 via the public switched telephone network (PSTN) 24. The user equipment sends a request to the operator 22 to be sent certain data, for example, a particular web page or e-mail. The operator receives this request and outputs the request to internet service provider (ISP) 26. In response to this request, the ISP supplies a response to the operator, which might comprise a requested web page obtained from the internet 27, or an e-mail which was waiting for the subscriber at the ISP. The operator delivers the response to the broadcast centre 28, where it is integrated into the MPEG bitstream, for example as a private section, and transmitted by the transmitter 6 and received by receiver 12 as previously described. Where the receiver/decoder is IP-enabled, i.e. equipped with the protocols for receiving data from the internet, the information may be transmitted as an IP frame in the MPEG bitstream, that is, in the IP format. If the receiver/decoder is not IP-enabled then the data is sent in some other way, e.g. as a private MPEG section. The user equipment 20 extracts the response from the MPEG bitstream and displays it on a television set or on a computer screen. The response may alternatively be transmitted to user equipment 20 via the PSTN 24.

Figure 4:
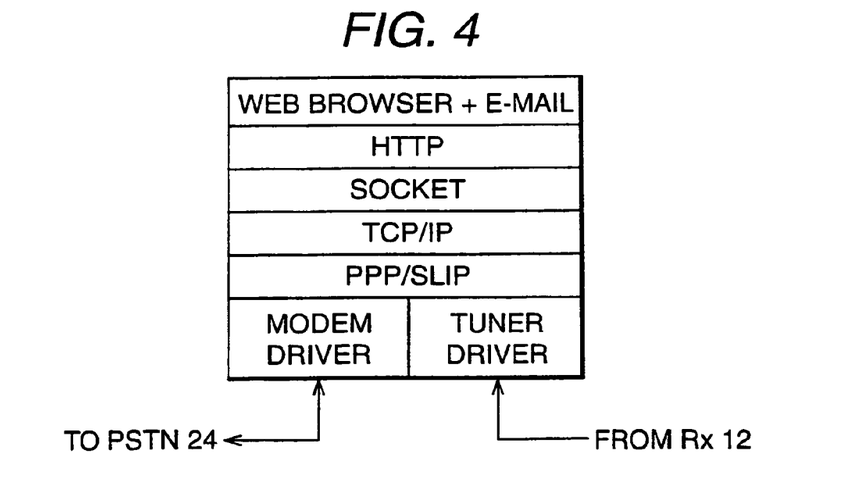
FIG. 4 illustrates software layers in the user equipment of FIG. 3.

The software levels employed in the user equipment 20 are shown in FIG. 4. The application level comprises a web browser and e-mail application, which may be a commercial application such as Netscape or Microsoft Internet Explorer and Outlook Express, or an application specifically designed to run on a receiver/decoder. Below the application level are HTTP, socket, TCP/IP, PPP/SLIP and a driver level. The driver level is modified, as compared with a browser application running traditionally on a PC, in that it is divided into a modem driver for communicating with the PSTN 24 via the modem of the user equipment and a tuner driver for communicating via the MPEG flow tuner 4028.

Various configurations of the user equipment 20 are possible. In one configuration a PC is not used and all of the user software runs on the receiver/decoder 13. In this configuration the receiver/decoder 13 communicates with the PSTN 24 either via an internal modem or via an external modem and the serial port. The receiver/decoder 13 can receive Internet responses in the bitstream from the earth receiver 12. The user interface is provided by a remote controller or keyboard and a television set connected to the receiver/decoder 13. In this configuration, the TCP/IP level shown in FIG. 4 may be omitted, in which case a gateway located at the operator provides the necessary protocols, as will be described later.

In another configuration a personal computer (PC) is provided which is connected by its parallel port to the parallel port 32 of the receiver/decoder 13 (or optionally by its serial port to the serial port 30 of the receiver/decoder 13).

In this case, an upper portion of the software levels shown in FIG. 4 run on the PC, and the remaining lower portion of the software levels run on the receiver/decoder 13. The user interface is provided by a keyboard and a monitor connected to the PC.

In a further configuration a PC is connected to the PSTN 24 via an internal or external modem of the PC. In this configuration, the receiver/decoder 13 may be provided separately or in the form of an add-on or plug-in card of the PC, connected to the ISA or PCI bus thereof.

Figure 5:
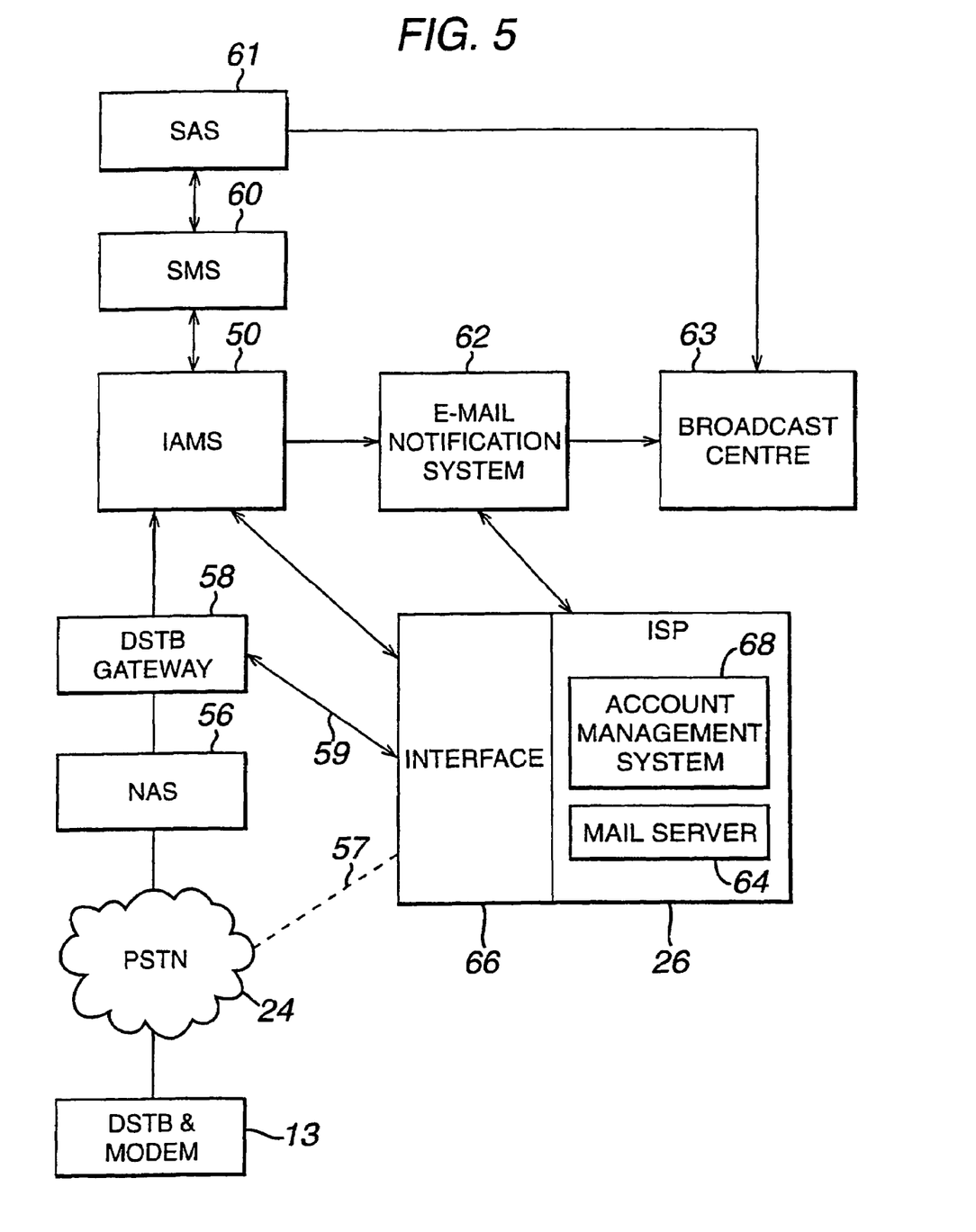
FIG. 5 shows the architecture of an internet access system.

The architecture of the internet access system is shown in FIG. 5. Referring to FIG. 5, internet account management system (IAMS) 50 is linked to internet service provider (ISP) 26 which provides services such as web browsing and e-mail. The IAMS 50 is also linked to subscriber management system (SMS) 60 which manages subscribers and sends requests to the IAMS to grant or deny access to internet services. Receiver/decoder 13 is connected to the IAMS via an internal modem, the public switched telephone network (PSTN) 24, network access server (NAS) 56, and gateway 58.

The SMS is also connected to Subscription Authorisation System (SAS) 61, which manages authorisations and subscribers' orders for broadcast services, such as broadcast television services. The SMS runs the SAS and IAMS systems in parallel and ensures consistency between the two systems. Communication between the SMS and the SAS and IAMS takes place using a real time TCP/IP link using batch files.

Gateway 58 allows subscribers to access internet services in real time. Such services include mail services for sending and receiving mail and other services which may be provided by ISP 26, and provisioning services and reminder services, which are provided by the IAMS. The gateway 58 is a message router that enables communication with various different systems in a single modem connection. Where the receiver/decoder is not equipped with TCP/IP protocols for communicating with the ISP, the gateway also provides the necessary protocols for the receiver/decoder to communicate with the ISP. The receiver/decoder 13 then communicates with the ISP via gateway 58, as indicated by line 59 in FIG. 5. Where the receiver/decoder is equipped with the necessary protocols, communication can take place with the ISP directly, as indicated by dashed line 57 in FIG. 5.

ISP interface 66 allows each modification related to a user's account which takes place in the IAMS to be duplicated to a user account in ISP 26 in charge of hosting internet services, such as mail services. It should be noted that all information relating to subscriber accounts is centralised in the IAMS, which ensures the management of TV and internet parameters. The IAMS also manages the relationship between the internet parameters and TV parameters, through its interface with Subscriber Management System (SMS) 60. SMS 60 manages subscribers and sends requests to the IAMS in order to grant or to deny access to internet services by subscribers.

In order to set up an IAMS account, a subscriber first sends a request for a new account, together with information such as requested e-mail address and selected options, from the receiver/decoder 13 to the IAMS 50. The IAMS checks the smartcard number of the subscriber against a list of smartcard numbers, obtained from subscriber management system (SMS) 60, corresponding to subscribers for which it may set up internet accounts. The IAMS then sends a request to the ISP to set up an internet account. Once the account has been set up, the ISP returns an acknowledgement to the IAMS, together with a password. The password is initially defined by the SMS, but may be modified later by the subscriber. The IAMS account information (password, e-mail address and internet parameters), is stored in the IAMS, along with the smartcard number of the subscriber. The IAMS informs the subscriber that his account has been set up. The subscriber can then send and receive mail to and from the mail server 28.

The main components of the IAMS are shown in FIG. 6. The main functions of the IAMS are as follows:
- maintaining a centralised list of e-mail account parameters linked to subscriber parameters such as smartcard number
- granting or denying access to internet services for a subscriber at the request of the SMS
- customising internet accounts at the request of subscribers (provisioning)
- reminder service, which allows an e-mail user to register an event and to be warned by an e-mail at the time of the event
- duplication service, which allows updates of the IAMS contents to be copied to a related server, such as an ISP Central to the IAMS is a relational database management system (RDBMS) 70, which contains subscription information for internet services and e-mail accounts, stored in storage means 72. SMS communication interface 74 allows the IAMS to communicate with the SMS, so that the IAMS may be updated with the details of subscribers who have been granted or denied access to mail services. Provisioning server 76 allows a subscriber to manage and customise his e-mail account. Reminder server 78 allows a subscriber to manage a list of events. An event is related to a subscriber's e-mail account. A subscriber may register an event and receive an automatic reminder a predetermined number of days before the event via an automatically generated e-mail. E-mail notification interface 84 allows the EMNS 62 to search for a subscriber's notification preferences in the IAMS RDBMS 70 in order to send an over air notification message. Support server 80 allows an administrator to check the presence and the status of a subscriber or an e-mail user in the IAMS. Replication service 82 copies updates of the contents of the IAMS RDBMS 70 to the ISP account management system.

Requests which are sent to the IAMS from receiver/decoder 13 are directed to the appropriate part of the IAMS, such as the provisioning server (for e-mail account management) and the reminder server (to manage reminder events), by the gateway 58.

The internet access system described above allows broadcast service providers also to provide internet services. The operator of the system maintains internet accounts independently of internet service providers, so that the operator is not tied to a particular internet service provider. By linking together subscriptions to broadcast services and subscriptions to the internet, accounts for the two services may be managed together which may reduce the amount of processing involved, in comparison to the case where accounts are managed separately, and the subscriber may be billed together for the two services.

Further details of the e-mail notification system are described in co-pending patent application entitled "Method and Apparatus for use with E-mail" in the name of the present applicant, the subject matter of which is incorporated herein by reference. Further details of the gateway, and the method of communication between the receiver/decoder and the IAMS and the ISP, are described in co-pending application entitled "Communication Methods and Apparatus" in the name of the present applicant, the subject matter of which is incorporated herein by reference.

The various components of the IAMS will now be described in more detail.

The IAMS RDBMS

The IAMS RDBMS contains subscription information for Internet Service and Mail accounts parameters. The IAMS RDBMS contains three types of parameters:

Global parameters. These parameters apply to the whole IAMS system.

Subscriber parameters. These parameters are related to the subscriber's accounts.

User parameters. These parameters are related to the user's accounts (Mail parameters). For each subscriber there may be several users, each with their own e-mail address.

The global parameters comprise:

Domain name for Mail address. This is the name of the server which is used for e-mail.

Maximum number of user accounts per subscriber account.

Maximum number of aliases per E-mail address.

Maximum number of events (Reminder services) per e-mail address.

Black list of e-mail addresses.

For each subscriber the following parameters are stored:

SmartCard number.

Password (optional).

Status of the subscriber (Suspended, Activated).

Last operation type on the subscriber account.

For each Mail account the following parameters are stored:

Link to the related subscriber's SmartCard number.

E-mail identifier (E-mail_ID@operator_domain_name).

Mailbox password.

Notification preferences (never being notified, notification at each mail received, notification at first new mail).

User first and last name (as defined by the user via the provisioning server).

Related list of Reminder events (optional).

Forward address (optional).

E-mail aliases (optional).

Status of the Mail account (activated, suspended).

Duplication status.

Last operation type on the Mail account.

Interface with SMS and/or SAS

The Interface with the SMS allows messages to be passed between the IAMS and the SMS, for example, to update the IAMS with subscribers having access to Internet services. The following messages may be passed between the SMS and the IAMS:

Subscription Creation. This message is sent by the SMS to register a subscription Subscription Cancellation. This message is used to cancel a subscription. It leads to the immediate deletion of all data relating to the subscriber's accounts in the IAMS and on the related Internet servers.

Subscription Modification. This message is used to modify a subscription, for example, by adding a commercial offer or changing the password.

Subscription Suspension. This message is sent by the SMS to suspend an account. The subscriber can then no longer access the internet services offered by the operator. Nonetheless, all data related to the subscriber's internet accounts are kept in the IAMS and on the related internet servers for possible subscription reactivation.

Subscription Reactivation. This message is sent by the SMS to reactivate a subscription. The subscriber can then access internet services provided by the operator which had been barred due to a subscription suspension command.

Reset Password. This command is sent by the SMS when a subscriber wishes to reinitialize his subscription password. The new password is supplied by the SMS and stored at the IAMS. An operator at the call centre resets the password and the new password is communicated to the subscriber in real time.

SmartCard Exchange. On receipt of this message, the IAMS creates a new smartcard/operator link and copies the information found in its own database concerning the subscription of the old smartcard, that is, passwords, e-mail addresses and internet parameters, so that it is linked to the new smartcard number.

Billing Information. Billing information, such as connection time to the internet, is passed from the IAMS to the SMS for billing purposes.

Service Information. Messages such as acknowledgement or refusal, state modification and message return requests are passed between the two systems.

Provisioning Server

This interface allows a subscriber to manage his e-mail accounts himself by means of a number of standard actions which are available to subscribers. Account registration consists of registering the accounts on a centralised database system (the IAMS RDBMS) and duplicating them to the mail servers. Standard actions are:

Create, modify or delete an e-mail account,

List the existing mail accounts related to a subscriber (based on his SmartCard number).

When creating a new user account, the subscriber specifies the user ID that he wishes to use, and the first and last names which are to be associated with that user (for example, for sending with e-mails from that user). In certain embodiments, the name may be modified later on request from the subscriber.

The maximum number of e-mail accounts that a subscriber can create is configured as a global parameter.

The subscription process is done online in order to acknowledge the request to the subscriber in real time. To preserve independence between the IAMS system and the ISP account management system, once the request is acknowledged to the subscriber, the request is then sent automatically to the ISP interface. Account management requests may be sent to the ISP in asynchronous mode (MQS) or in synchronous mode (TCP/IP Connection). On the subscriber's side, communication is always in asynchronous mode, that is, the IAMS acknowledges the request to the subscriber before sending it to the ISP.

The IAMS stores the status of the duplication in the ISP account management system (In progress, Done, Error etc.). The corresponding Mail account can not be updated until the status of the duplication in the IAMS RDBMS is recorded as "Done".

The IAMS manages a user ID "black list" which includes all forbidden user IDs. Once a user ID is added to the User ID black list, the IAMS will ensure that no user will be delivered the related e-mail address.

In order to prevent an e-mail address being immediately re-allocated to a alternate user once deleted (and then allowing mails to be delivered to the wrong recipient), any deleted e-mail address is kept in quarantine before being made available to a further user by the provisioning server. The quarantine period automatically expires after a pre-defined delay.

Reminder Server

The reminder service allows a subscriber to register an event and receive an automatic reminder a predetermined number of days, for example, 1 to 15 days, before the date of the event via an automatically generally e-mail. Information about events is stored in the IAMS RDBMS and linked to a user e-mail account.

Standard actions are:

Create, modify or delete an event,

List the existing user events related to a mail account.

An event contains the date of the event, the date of the warning (from 1 to 15 days before the event), an event type (for example, birthday or wedding) and a free text. The maximum number of events that a subscriber is able to create is configured as a global parameter.

A subscriber accesses the reminder service through the e-mail application on the receiver/decoder to create or delete an event. Up date is done in real time on the IAMS.

The Reminder Server is also in charge of scanning the IAMS RDBMS every day to select the events to be announced. For each event to announce, it composes a new e-mail and sends it to the corresponding Mail address.

Email Notifier Communication Interface

The E-mail Notifier System allows subscribers to be notified as soon as they receive a new e-mail in their mailboxes. A short message is sent to their set-top box over-air.

Once the EMNS has received a notification request from the ISP, it searches in the IAMS RDBMS for the subscriber's notification preference (on or off) and related parameters needed to compose a notification message. The notification message is then sent to the broadcasting system, in order to be delivered to the subscriber.

Duplication Service

The duplication service is based on a Message Queue System (MQS, a message management system) or on a TCP/IP communication between the IAMS and the ISP. It receives requests from the IAMS RDBMS, and relays them to the ISP account management system. Request are forwarded in real time in asynchronous or synchronous mode.

All mailbox creation, modification or deletion commands are then duplicated to the ISP interface.

The IAMS RDBMS stores the status of the duplication of each request towards the ISP account management. The IAMS RDBMS expects an acknowledgement of each request processed by the ISP account management system (Done or Error). The acknowledgements exchanged between the ISP and the IAMS RDBMS are managed by the message queuing system (MQS), or by the same TCP/IP connection as for sending requests.

The main functions of the MQS are:

Providing a unique interface between the RDBMS and the ISP account management system.

Providing a reliable asynchronous service. All message exchanges are secure. Use of asynchronous mode allows both system (IAMS and ISP account management system) to be independent of each other.

The network protocol used is TCP/IP.

Support Server

The IAMS is provided with a Support Server which helps operators with customer care. The Support server provides the following features:

List Mail accounts for a given subscriber (identified either by his SmartCard number or one of his e-mail addresses).

Check the status of a subscriber account (Activated, Suspended).

Check the duplication status of a Mail account (Done, In Progress, Error etc.).

Check the matching of a Mail account password.

Check the notification preferences for a Mail account.

List Reminder Events for a mail account.

Check the last operation type on an account, as well as the date of the last operation.

Administrative Tools

The IAMS is provided with administrative tools to help IAMS administrators with the following tasks:

Remove an single entry from the quarantine list

Re-send a duplication command to the ISP

The IAMS is a multi-faceted system implemented through various processes. The IAMS database contains the operator data which is required for the correct operation of the system. All the tools require to management these data properly are part of the IAMS furniture.

The role of the administration tools is to exploit the IAMS system by:

Launching each process

Stopping the processes

Monitoring the processes,

Setting or retrieving internal parameters of the processes.

IAMS High Availability

The IAMS High Availability System is a specialised facility for protecting mission-critical applications from a wide variety of hardware and software failures.

It monitors the health of each node and responds to failures in a way that minimises application downtime. It is able to detect and respond to failures in the following components:

System processors

System memory

LAN media and adapters

System processes

Application processes

With this system, application services and all the resources needed to support the application are bundled into special entities called application packages. These application packages are the basic units that are managed and moved within a cluster.

The High Availability System is configured into active—active recovery strategy. In an active—active configuration, every node runs at least one application package and provides backup services for one or more other packages running on other nodes.

Two application packages are defined:

The IAMS (IAMS RDBMS and Duplication Service)

The subscribers services (Provisioning Server, Reminder Server, E-mail Notifier)

The division of services into packages may differ depending on the sizing of the system. Each application is accessed by a virtual IP address which belongs to the package. When a package moves towards the other system, the second system mounts the related disks and activates the virtual IP address.

Implementation

In a preferred embodiment, the IAMS RDBMS is implemented using a Sybase Adaptive Server 11.9.2, the hardware of the IAMS is implemented with an HP/UNIX server, the operating system is implemented using HP-UX 11.0 software, and the software levels use HP Multi-computer/Service Guard and Netscape Web Server.

Terms

The following terms are used herein:

| | |
|---|---|
| E-mail Address | An E-mail address is composed of two fields: the E-mail ID and the domain name. The form of an e-mail Address is e-mail_Id@Domain_Name. |
| E-mail Account | An E-mail Account provides information about the user that a Mail Server needs to process that user's messages. |
| E-mail Id | The prefix of an e-mail address. An e-mail Id is unique in a domain name. |
| E-mail Notifier | The e-mail Notifier System allows subscribers (EMN) to be notified as soon as they receive a new e-mail in their mailboxes. A short message is sent to their STB over-air. |
| Internet Account Management System | A system managing subscriber TV account Management parameters and related E-mail Accounts System (IAMS) parameters. |
| Mailbox | Messages stored for IMAP delivery are held in a mailbox. A mailbox on a mail server must be uniquely identified by a mailbox Id. A mail server hosting different domain name can not consider that the Email Id is unique on the Mail server, so the mailbox Id must be the Email address. |
| Mail Server | Program that exchanges e-mail with other Mail Servers and accepts and delivers messages to mail clients. |
| Message Queue Server (MQS) | A message management system. |
| Provisioning Server | Allows subscribers to create and customise e-mail accounts themselves. |
| Reminder Server | Allows a user to register an event and receive an automatic reminder via an automatic mail. |
| Set Top Box | The completely assembled, ready to use (STB) digital decoding hardware, manufactured in accordance with Digital Video Broadcasting standards, CANAL + TECHNOLOGIES specifications. It is used as a digital decoder for transmitted video, audio, application and data streams so that the end user can access television programs and services. |
| SmartCard | Cards that electronically store the secret keys of one or more commercial operators and other access information. |
| Subscriber | A subscriber is related to a TV account (i.e. a SmartCard number). |
| Subscriber Management System (SMS) | A system managing data relating to subscribers. |
| User | A user is related to an e-mail account. There may be multiple users for a single subscriber. |

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A subscriber information management system for use with a broadcast system, comprising:

means for storing subscriber internet parameters relating to access to internet services by a subscriber;

means for storing subscriber broadcast parameters relating to access to broadcast television by the subscriber, wherein the subscriber has a first subscription for access to internet services and a second subscription for access to broadcast television; and means for processing requests relating to access to internet and broadcast services that allows the broadcast system to provide internet services to the subscriber, wherein providing internet services to the subscriber comprises allowing the subscriber to interactively use internet services, and wherein said internet and broadcast parameters are linked by the subscriber information management system, and wherein the linked internet and broadcast parameters are used to relate the first subscription and the second subscription and to obtain internet services and broadcast services.

2. The subscriber information management system according to claim 1, wherein the subscriber broadcast parameters comprise information relating to the subscriber's subscription to broadcast television, and the subscriber internet parameters comprise information relating to the subscriber's subscription to internet services.

3. The subscriber information management system according to claim 1, further comprising means for providing access to internet services for a subscriber having given broadcast parameters.

4. The subscriber information management system according to claim 1, wherein said internet services include services for sending and receiving mail over the internet.

5. The subscriber information management system according to claim 4, wherein said subscriber internet parameters comprise information relating to e-mail accounts of subscribers.

6. The subscriber information management system according to claim 5, wherein the subscriber internet parameters comprise e-mail addresses.

7. The subscriber information management system according to claim 1, comprising means for monitoring usage of the internet by the subscriber to provide billing information.

8. The subscriber information management system according to claim 1, wherein the subscriber broadcast parameters comprise identifiers of receiver/decoders.

9. The subscriber information management system according to claim 8, where the identifiers of receiver/decoders are based on numbers of smartcards issued in association with the receiver/decoders.

10. The subscriber information management system according to claim 1, wherein the system is adapted to send data to a receiver/decoder via the broadcast system, which data include an identifier of the receiver/decoder.

11. The subscriber information management system according to claim 1, further comprising means for storing information relating to the status of a subscriber.

12. The subscriber information management system according to claim 1, further comprising means for storing information relating to a subscription input by a subscriber over the internet.

13. The subscriber information management system according to claim 1, further comprising means for storing information relating to previous operations of an account by a subscriber.

14. The subscriber information management system according to claim 1, further comprising an interface for communicating with a Subscriber Management System which manages subscriptions to broadcast services.

15. The subscriber information management system according to claim 14, comprising an internet account management system adapted to receive subscription information from said Subscriber Management System.

16. The subscriber information management system according to claim 14, wherein the subscriber information management system is adapted to provide billing information to said Subscriber Management System.

17. The subscriber information management system according to claim 1, further comprising means for copying at least some of the subscriber internet parameters to an internet service provider.

18. The subscriber information management system according to claim 1, further comprising a gateway for access to an internet service provider by a receiver/decoder.

19. The subscriber information management system according to claim 1, further comprising means for allowing a subscriber to register an event and means for generating an e-mail on occurrence of the event.

20. A broadcast system, comprising:
- a subscriber information management system, the subscriber information management system, comprising:
- means for storing subscriber broadcast parameters relating to access to internet services by the subscriber,
- means for storing subscriber broadcast parameters relating to access to broadcast television by the subscriber, wherein the subscriber has a first subscription for access to internet services and a second subscription for access to broadcast television, and
- means for processing requests relating to access to internet and broadcast services, which allows the broadcast system to provide internet services to the subscriber,
- wherein providing internet services to the subscriber comprises allowing the subscriber to interactively use internet services, and
- wherein said internet and broadcast parameters are linked by the subscriber information management system, and wherein the linked internet and broadcast parameters are used to relate the first subscription and the second subscription and to obtain internet services and broadcast services.

21. The broadcast system according to claim 20, including a Subscriber Management System for managing subscriptions to broadcast television.

22. The broadcast system according to claim 20, further comprising an Internet Service Provider, wherein the subscriber information management system is adapted to store subscriber information including subscriber smartcard numbers, and not to pass the subscriber smartcard numbers to the Internet Service Provider.

23. The broadcast system according to claim 20, comprising a subscriber information management system for storing subscriber information including subscriber smartcard numbers, and an Internet Service Provider, wherein the subscriber smartcard numbers are not passed to the Internet Service Provider.

24. A method of managing subscriber information, comprising:
- storing subscriber internet parameters relating to access to internet services by a subscriber and subscriber broadcast parameters relating to access to broadcast television by the subscriber, wherein the subscriber has a first subscription for access to internet services and a second subscription for access to broadcast television; and
- processing requests relating to accessing the internet and broadcast services, thereby allowing a broadcast system to provide internet services to the subscriber,
- wherein providing internet services to the subscriber comprises allowing the subscriber to interactively use internet services, and
- wherein said internet and broadcast parameters are linked, and wherein the linked internet and broadcast parameters are used to relate the first subscription and the second subscription and to obtain internet services and broadcast services.

25. The method according to claim 24, wherein the subscriber broadcast parameters comprise information relating to the subscriber's subscription to broadcast television, and the subscriber internet parameters comprise information relating to the subscriber's subscription to internet services.

26. The method according to claim 24, comprising providing access to internet services for a subscriber having given broadcast parameters.

27. The method according to claim 24, comprising monitoring usage of the internet by the subscriber to provide billing information.

28. The method according to claim 24, wherein data is sent to a receiver/decoder via the broadcast system, which data include an identifier of the receiver/decoder.

29. The method according to claim 24, comprising storing information relating to the status of a subscriber.

30. The method according to claim 24, comprising storing information relating to a subscription input by a subscriber over the internet.

31. A method for managing subscriber information, comprising:
- storing subscriber internet parameters relating to access to internet services by a subscriber and subscriber broadcast parameters relating to access to broadcast television by the subscriber, wherein the subscriber has a first subscription for access to internet services and a second subscription for access to broadcast television, wherein the first subscription and the second subscription are not associated with each other, and wherein said internet and broadcast parameters are linked, and wherein the linked internet and broadcast parameters are used to relate the first subscription and the second subscription and to obtain internet services and broadcast services;
- sending a request for internet services, wherein the request is sent by the subscriber using a receiver/decoder;
- forwarding the request to an internet service provider (ISP), wherein the ISP is configured to use the subscriber internet parameters to obtain a response to the request, wherein the request is forwarded to the ISP via a gateway, if the receiver/decoder is not enabled to directly communicate with the ISP;
- sending data in response to the request for internet services to the receiver/decoder via a broadcast system, wherein the broadcast system is configured to provide internet services to the subscriber; and
- forwarding the data to the receiver/decoder, wherein the receiver/decoder is configured to extract and display the data.

* * * * *